(12) United States Patent
Marelli

(10) Patent No.: US 6,554,551 B1
(45) Date of Patent: Apr. 29, 2003

(54) HEAD FOR MACHINE TOOL

(75) Inventor: Flavio Marelli, Meda (IT)

(73) Assignee: F.M. Elettromeccanica s.r.l., Meda (IT)

( * ) Notice: Subject to any disclaimer, the term of this patent is extended or adjusted under 35 U.S.C. 154(b) by 0 days.

(21) Appl. No.: 09/689,744

(22) Filed: Oct. 13, 2000

(30) Foreign Application Priority Data

Oct. 14, 1999 (IT) .......................................... MI99A2150

(51) Int. Cl.[7] ................................................. B23C 1/12
(52) U.S. Cl. ...................... 409/201; 409/211; 409/230; 409/231
(58) Field of Search ................................ 409/201, 211, 409/216, 231, 233, 135, 136, 144, 230

(56) References Cited

U.S. PATENT DOCUMENTS

| | | | | |
|---|---|---|---|---|
| 3,559,257 A | * | 2/1971 | Lemelson | 29/563 |
| 4,077,736 A | * | 3/1978 | Hutchens | 409/231 |
| 4,583,894 A | * | 4/1986 | Mitchell | 409/233 |
| 4,635,328 A | * | 1/1987 | Palmer | 29/26 A |
| 4,636,135 A | * | 1/1987 | Bancon | 901/41 |
| 4,664,588 A | * | 5/1987 | Newell et al. | 901/41 |
| 4,676,142 A | * | 6/1987 | McCormick et al. | 901/30 |
| 4,992,012 A | * | 2/1991 | Cioci | 409/136 |
| 4,993,132 A | * | 2/1991 | Manz | 409/233 |
| 5,636,949 A | * | 6/1997 | Nakamura et al. | 409/231 |
| 5,697,739 A | * | 12/1997 | Lewis et al. | 409/230 |
| 6,122,808 A | * | 9/2000 | Popp | 409/231 |
| 6,402,443 B1 | * | 6/2002 | Hoppe | 409/230 |
| 6,474,914 B1 | * | 11/2002 | Lang | 409/231 |
| 2001/0046423 A1 | * | 11/2001 | Columbo | 409/230 |

FOREIGN PATENT DOCUMENTS

GB          2118522 A     * 11/1983

\* cited by examiner

*Primary Examiner*—David W. Howell
(74) *Attorney, Agent, or Firm*—Greenberg Traurig; Richard E. Kurtz, II

(57) ABSTRACT

The present invention describes a head for machine tool on which an electro-spindle is mounted and in particular it describes a tilting head for machine tool on which an electro-spindle is mounted. In one embodiment the invention comprises a tilting head for machine tool comprising: one support element coupled to said tilting head; one electro-spindle; one cradle suitably shaped to incorporate and hold said electro-spindle pivoted on said support element so that it can turn around an axis perpendicular to the axis of said tilting head; said electro-spindle being set up to have mechanic, electric, pneumatic and hydraulic connections with said cradle; wherein said connections of said electro-spindle are of the releasable type so that said electro-spindle is interchangeable and can be rapidly coupled to and uncoupled from said cradle.

27 Claims, 10 Drawing Sheets

HEAD FOR MACHINE TOOL

FIELD OF THE INVENTION

The present invention refers to a head for a machine tool on which an electro-spindle is mounted, and in particular it refers to a tilting head for machine tool on which an electro-spindle is mounted.

BACKGROUND OF THE INVENTION

The head of a machine tool is the part where the spindle or the electro-spindle is housed, and that is a spindle containing the tool drive motor. In particular, a tilting head is a complex machine having one or two movement axes in addition to the movement axes already present in machine tools, which can, for example, be two or more.

A two-axis tilting head has a first element that rotates around a first axis convergent to the axis of the head and a second element, connected to the first element, that rotates around a second axis transversal in relation to the first axis. The electro-spindle, to which the working tool will be applied, is connected to the second element. The means of fastening to the machine tool (thrust rings) are associated to the head, which can permit the movements mentioned above, the motor members and eventual reduction gears and gears for transferring the motion. Also present are the means for the electric, hydraulic and pneumatic connections necessary for operating and controlling the tilting head.

Machine tools are well known, in particular those of large size, in which the head can be replaced to be able to connect another, automatically or semi-automatically so as to carry out working operations with different speeds and power.

In view of the state of the technique described, object of the present invention is to provide a versatile head for machine tool which also enables different types of working operations to be carried out.

SUMMARY OF THE INVENTION

In accordance with the present invention, said object is reached by means of a tilting head for machine tool comprising: a support element coupled to said tilting head; an electro-spindle; a cradle with a suitable shape for incorporating and holding said electro-spindle pivoted on said support element so that it revolves around an axis which is perpendicular to the axis of said tilting head; said electro-spindle being set up to have mechanic, electric and pneumatic connections with said cradle; wherein said connections of said electro-spindle are of the releasable type so that said electro-spindle is interchangeable and can be rapidly coupled to and uncoupled from said cradle.

Said object is also reached by means of a system of coupling and uncoupling an electro-spindle from a cradle fixed on a machine tool, shaped so as to incorporate and hold said electro-spindle; said electro-spindle being set up to have mechanic, electric, pneumatic and hydraulic connections with said cradle; wherein said connections of said electro-spindle are of the releasable type so that said electro-spindle is interchangeable and can be rapidly coupled to and uncoupled from said cradle.

Said object is also reached by means of a machine tool having a head in accordance with the present invention.

Thanks to the present invention, it is possible to make a head in which only the electro-spindle, an element of reduced size, light and low cost, can be rapidly changed. Thanks also to the fact of the lower cost of an electro-spindle compared to a head, numerous electro-spindles with different configurations and/or power can be kept available so as to permit working both with large tools at low speed for roughing and with small tools at high speed for finishing.

Thanks to the present invention, in a machine tool with tilting head the interchangeability of the spindle gives greater versatility and is carried out in a simpler way and at lower cost than that of the change of the whole head. This goes also for a machine tool without tilting head.

BRIEF DESCRIPTION OF THE DRAWINGS

The characteristics and advantages of the present invention will appear evident from the following detailed description of several embodiments thereof, illustrated as non-limiting example in the enclosed drawings, in which.

DETAILED DESCRIPTION OF THE PREFERRED EMBODIMENTS

Figure 1:
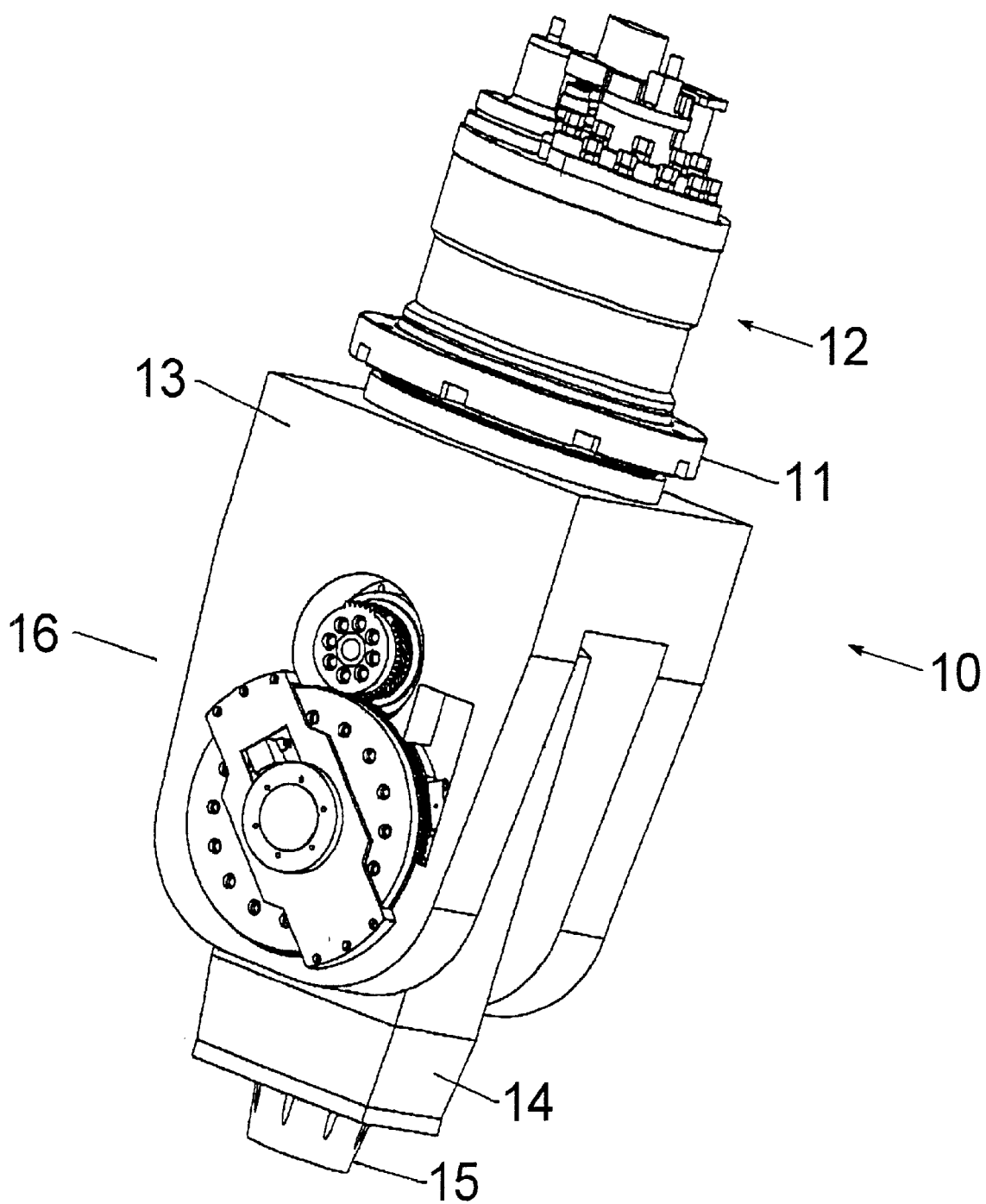
FIG. 1 represents an embodiment of the head of a machine tool in accordance with the present invention with internal tool coupling device.

According to a preferred embodiment, a two-axis tilting head 10 is represented in FIG. 1.

The tilting head 10 comprises a first thrust ring 11, so that the head 10 can be connected to a 3 axis machine tool (not shown) for example. A body 12 connected to the thrust ring 11 (machine side), is set up for electric, hydraulic and pneumatic connections between the head 10 and the machine tool. The base of a U-shaped support 13, is connected to the thrust ring 11 (head side). The support 13 is thus free to rotate around a first axis (axis of the head) corresponding to the axis of the thrust ring 11.

A cradle 14, shaped so as to incorporate and hold an electro-spindle 15, is pivoted 14 at the ends of the support U 13, along a second axis perpendicular to the axis of the thrust ring 11 (first axis).

The cradle 14 is activated by a motor, by an eventual reduction gear, by eventual rotary motion transmission gears 16 on a third axis parallel to that of the motor placed on support 13. A second thrust ring (not shown) is used as interconnecting means between the cradle 14 and the support 13.

Figure 2:
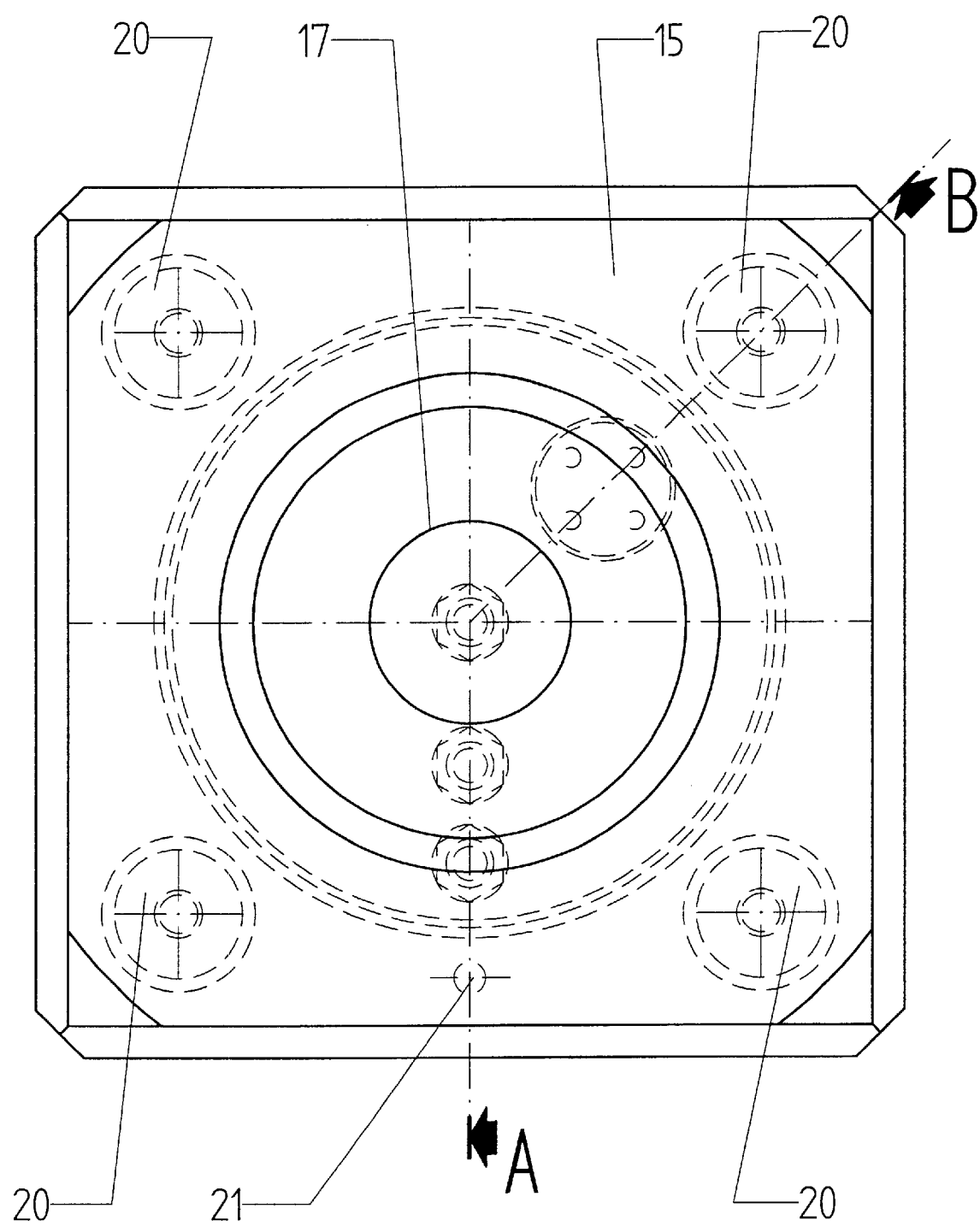
FIG. 2 represents the front view of an electro-spindle.

FIG. 2 represents the front view of an electro-spindle 15 with the coupling means 17 of the tool, where the layout of the hydraulic coupling/uncoupling devices 20 between the electro-spindle 15 and the cradle 14, and of the alignment pin 21 can be noted. Preferably, four devices 20 and one pin 21 are present.

Figure 3:
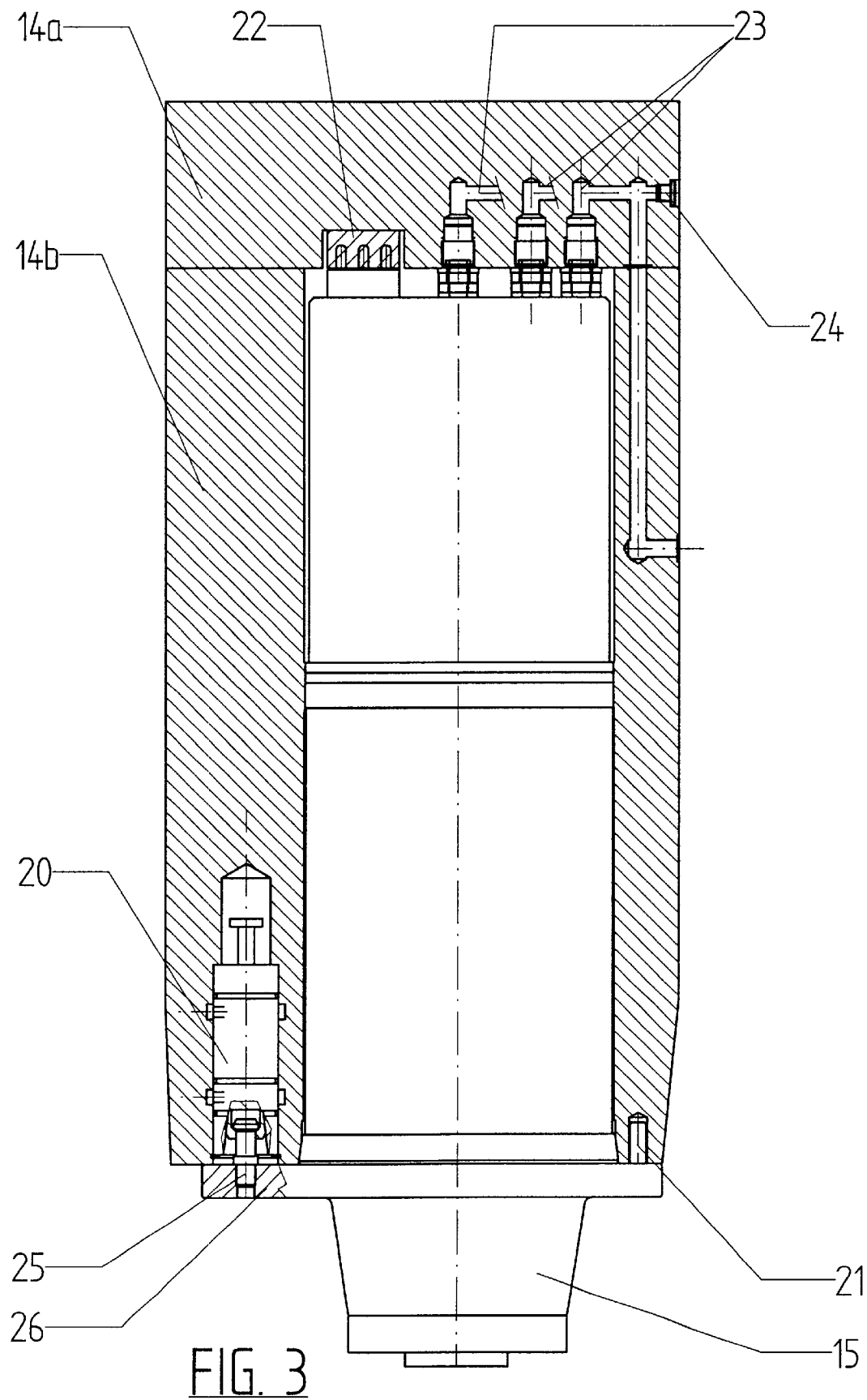
FIG. 3 represents a section along the line A–B of FIG. 2, of an electro-spindle connected to its support cradle.
Figure 4:
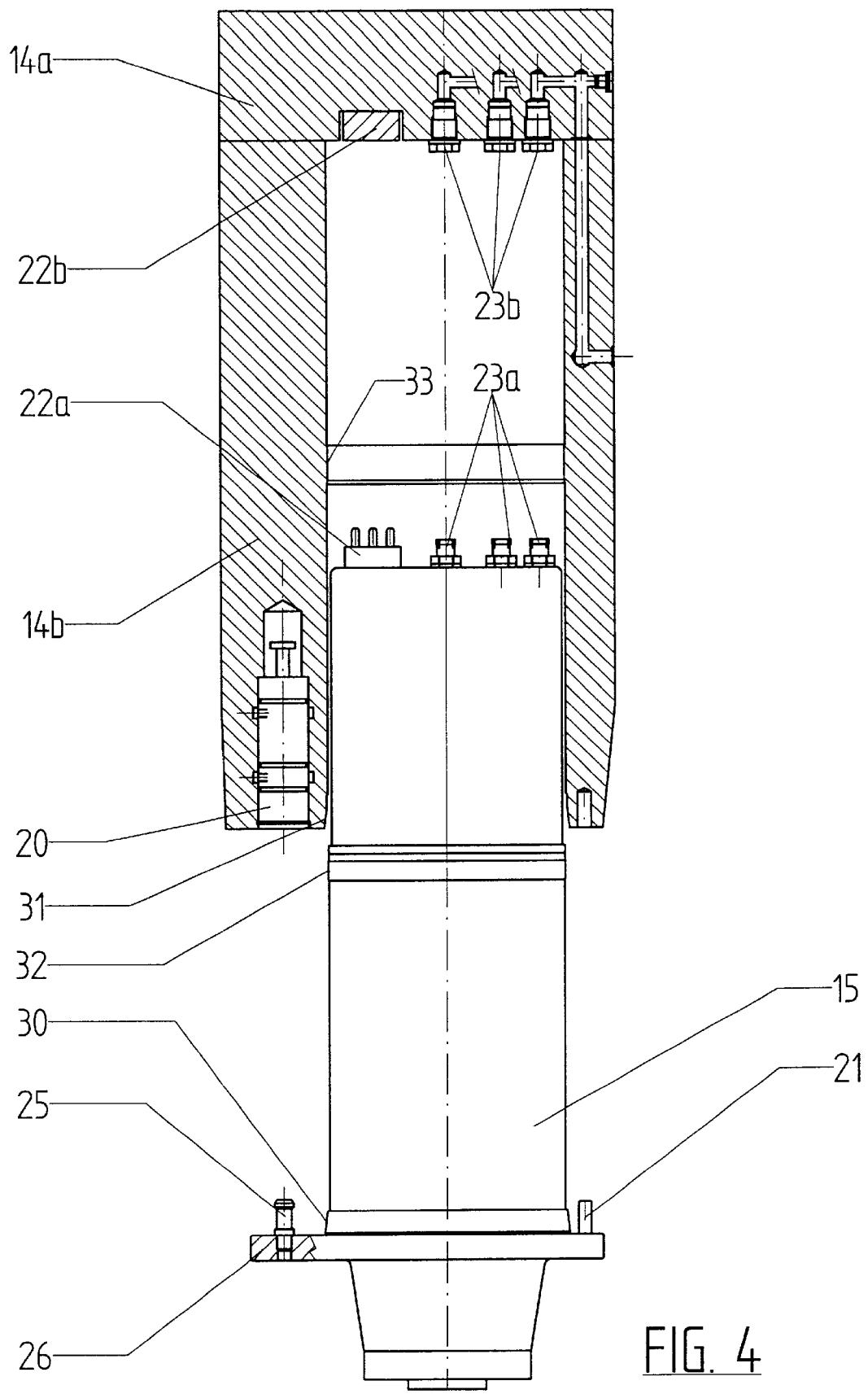
FIG. 4 represents a section along the line A–B of FIG. 2, of an electro-spindle partially extracted from its support cradle.

FIG. 3 represents a transversal section along the line A–B of FIG. 2, of an electro-spindle 15 connected to its support cradle 14, and FIG. 4 of an electro-spindle 15 partially extracted from its support cradle 14.

The electro-spindle 15, at one of its extremities, that where the tool will be applied, is provided with a flange 26 which will come up against the extremity of the cradle 14. The tangs 25 are placed on the flange 26, blocked in their seats on the cradle 14, by the hydraulic coupling/uncoupling devices 20 of the electro-spindle 15. Flange 26 is also provided with alignment pin 21 which can be positioned in the respective seat on cradle 14, to ease the alignment between the electro-spindle 15 and the cradle 14 during insertion and to keep it when it has been blocked.

The electro-spindle 15, at the rear of flange 26, has the body, for a preset part, of conical shape 30 (ASA type), suitable for adhering to a corresponding conical part 31 placed on the cradle 14, to support the centering between the electro-spindle 15 and the cradle 14. It is preferable if two more elements are present, made to touch each other to improve the centering of the electro-spindle 15 in the cradle 14, an element 32 is placed on the electro-spindle 15 and an element 33 is placed on the internal side surface of the cradle 14, placed, preferably, at about mid-length of the electro-spindle 15.

On the rear surface of the electro-spindle 15 are visible the electric connectors 22a and the hydropneumatic connectors 23a suitable for coming into contact and coupling with the respective electric connectors 22b and hydropneumatic connectors 23b placed on the internal surface of the bottom of the cradle 14.

The hydropneumatic interconnection drilling between the connectors 23b and the external environment, which are permanently connected to corresponding drillings of a rotating distributor (not shown) keyed on the axis perpendicular to the axis of the head, are also partially visible.

Preferably, the cradle 14 is subdivided into two parts that are separable by means of suitable fixing screws. A first part 14a corresponds to the rear part of the cradle 14, where the various connections are installed, and a second part 14b corresponds to the remaining part of the cradle 14. In this manner, it is possible to extract the first part 14a for greater visibility and easier maintenance of the connections 22 and 23.

Figure 5:
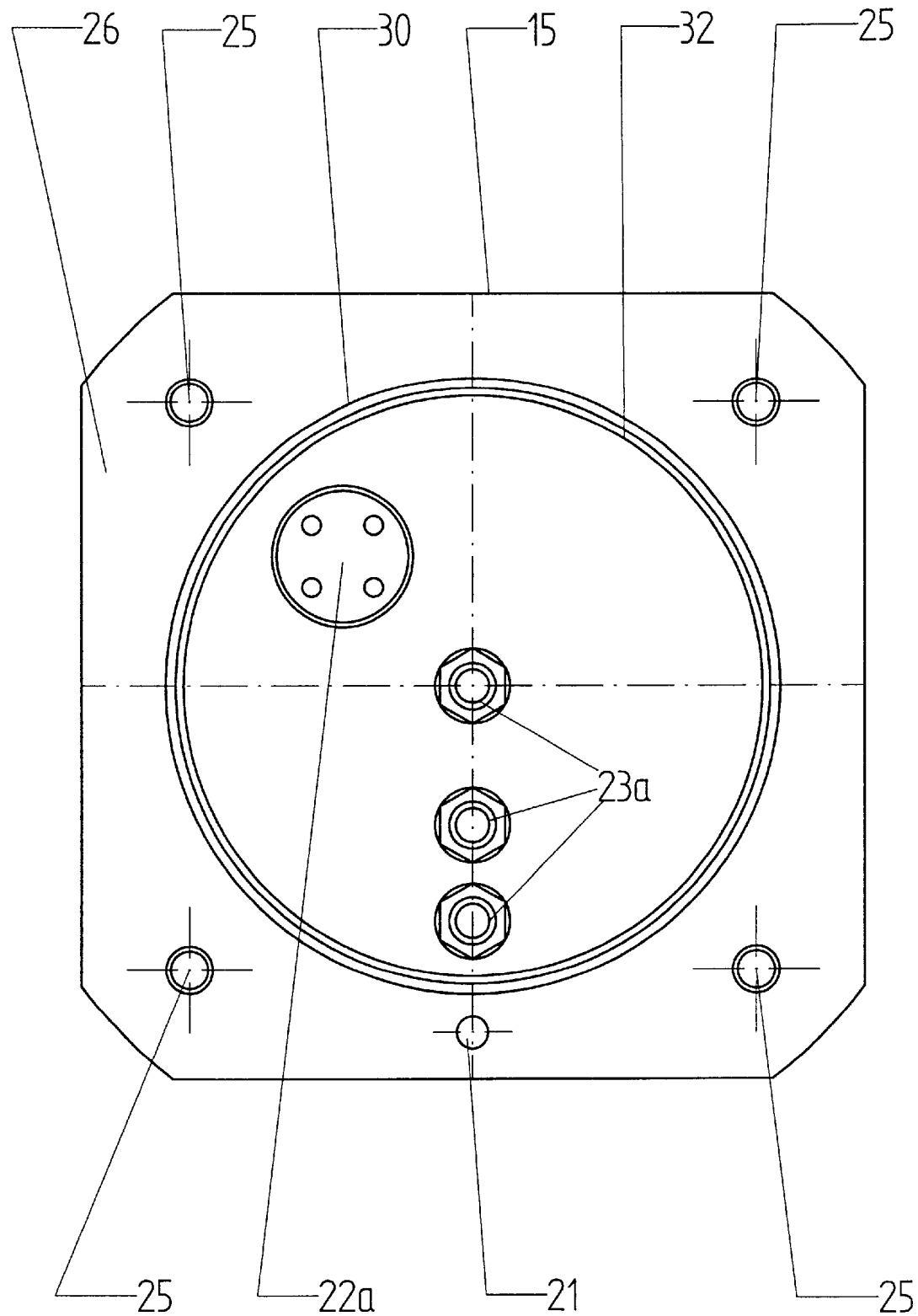
FIG. 5 shows the rear surface of the electro-spindle of FIG. 4 with the relative connectors.

FIG. 5 shows the rear surface of the electro-spindle 15 of FIG. 4, that is the flange 26 with the relative electric connectors 22a and the hydropneumatic connectors 23a.

Figure 6:
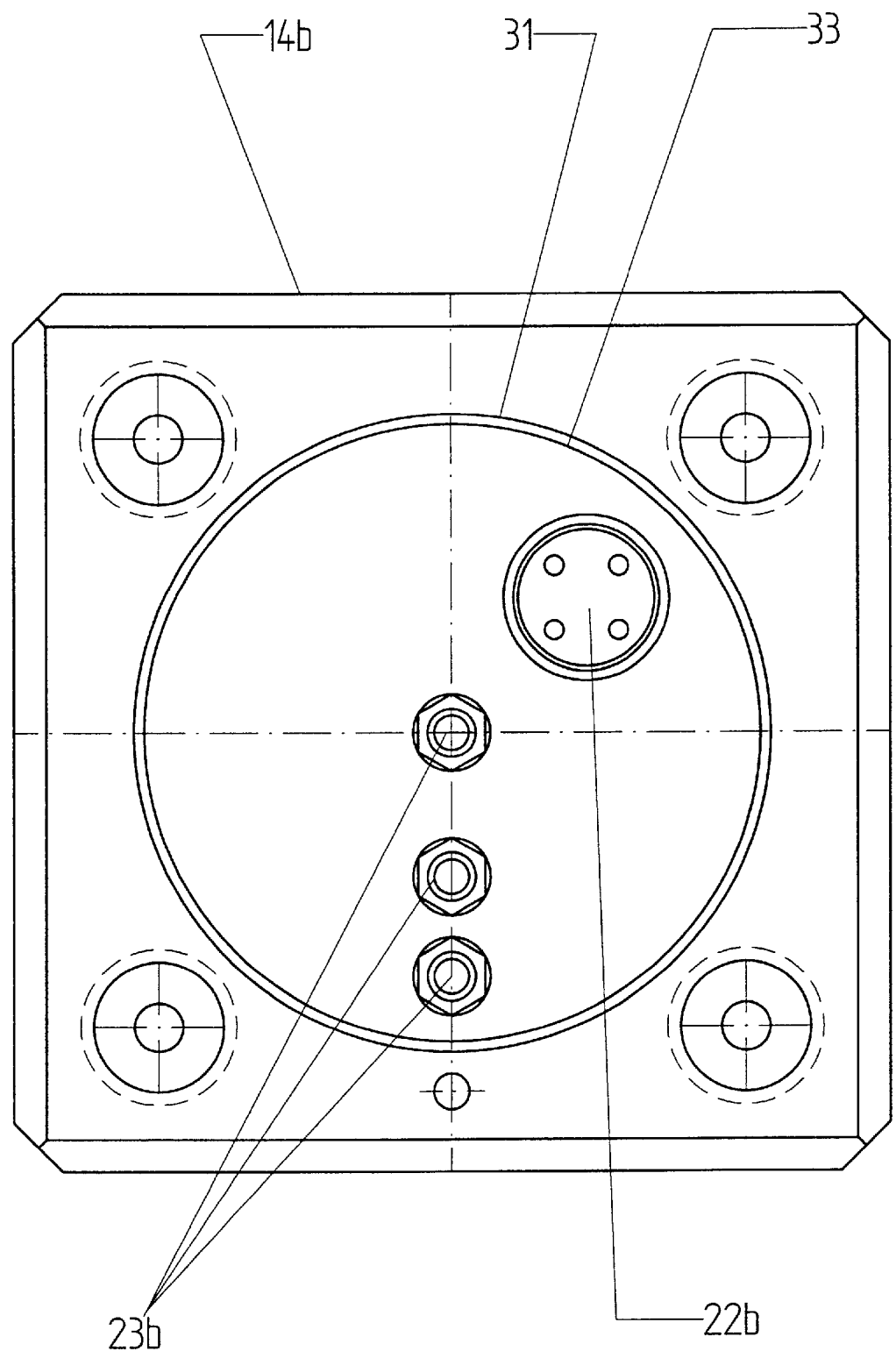
FIG. 6 shows the internal bottom surface of the cradle of FIG. 4 with the relative connectors.

FIG. 6 shows the internal bottom surface of the cradle of FIG. 4, which comes up against the flange 26, with the relative connectors 22b and 23b positioned so that they connect to the connectors 22a and 23a.

The hydropneumatic connections 23 comprise the hydraulic connections (water, oil) and the pneumatic connections (compressed air) necessary for the operation of the electro-spindle 15, namely cooling, tool change, tool cooling, pneumatic barrier and tool cleaning. Quick coupling connectors are used, in which the coupling and the separation are carried out automatically without leakages. The connectors are for example of the CyFit type made by the company CyTech.

The coupling/uncoupling hydraulic devices 20 of the electro-spindle 15, are for example of the pneumatic control type, of the CyDim type made by the company CyTech.

Once the tang 25 has been blocked through the application of compressed air, to a first point of air input, the devices 20 can keep the blocking force without the support of pressure. To release it, the support of compressed air to a second air input point is again necessary.

The quick coupling electric connectors 22, type MIL, are of two types, a first type is for feeding the motor of the electro-spindle, and a second type is for the control signals, such as those for change and presence of tool, vectorial or revolution indicator control, thermal probes, overload cut-outs etc.

In the example of the embodiment of the invention described up to this point, the electro-spindle 15 is set up for the connection in a cradle 14 applied to a two-axis tilting head 10, but it can also be applied to a tilting head with only one axis, (for example only the second axis perpendicular to the axis of the head). Or, the electro-spindle 15 can also be applied directly to a machine tool: the cradle 14 can be applied to the machine tool, by means of special fixing means, leaving or not the possibility of the possible subdivision of the cradle 14 into the two parts 14a and 14b, or be integral part of the machine tool itself.

Figure 7:
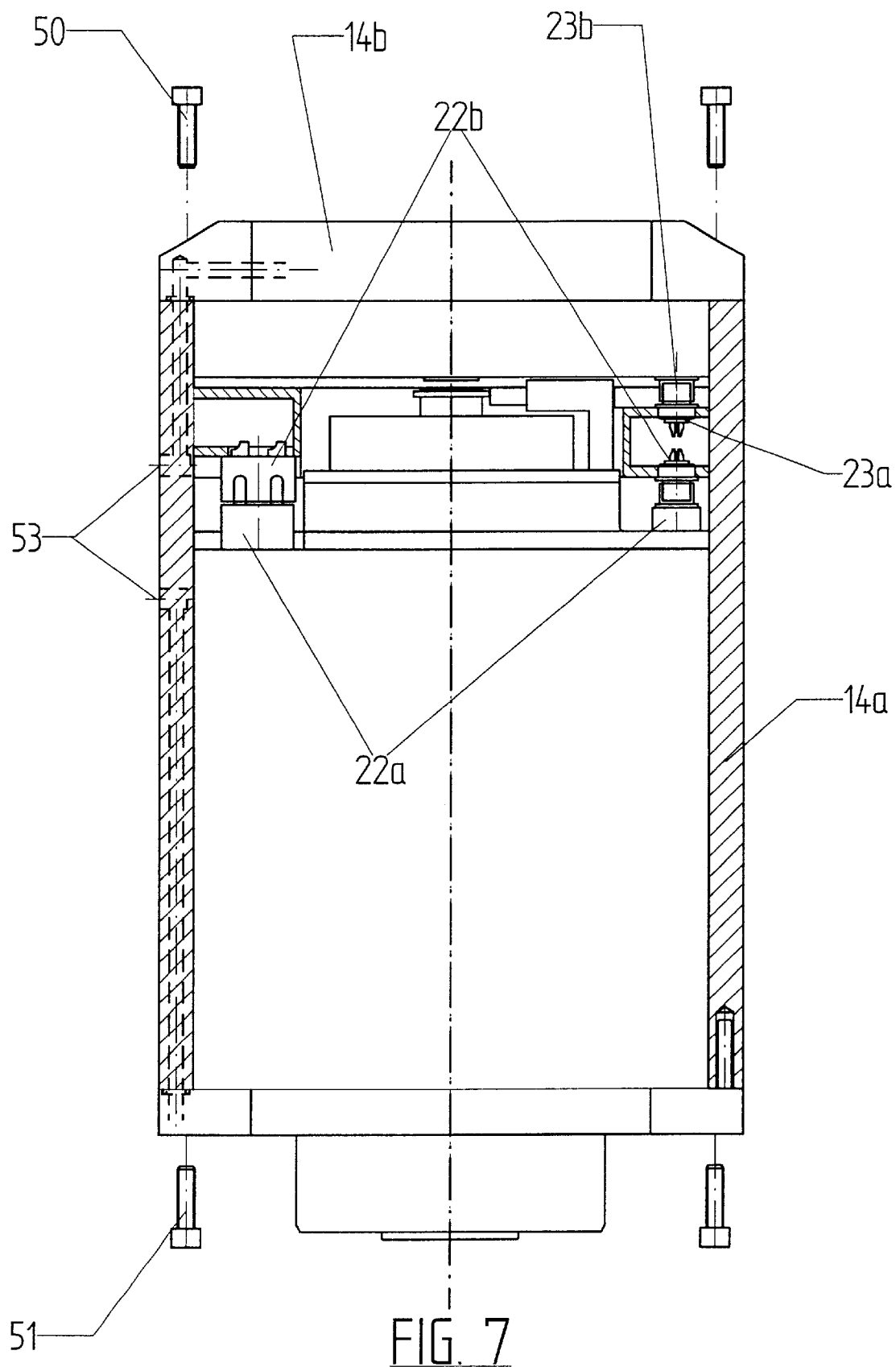
FIG. 7 represents a section of an electro-spindle connected to its support cradle.
Figure 8:
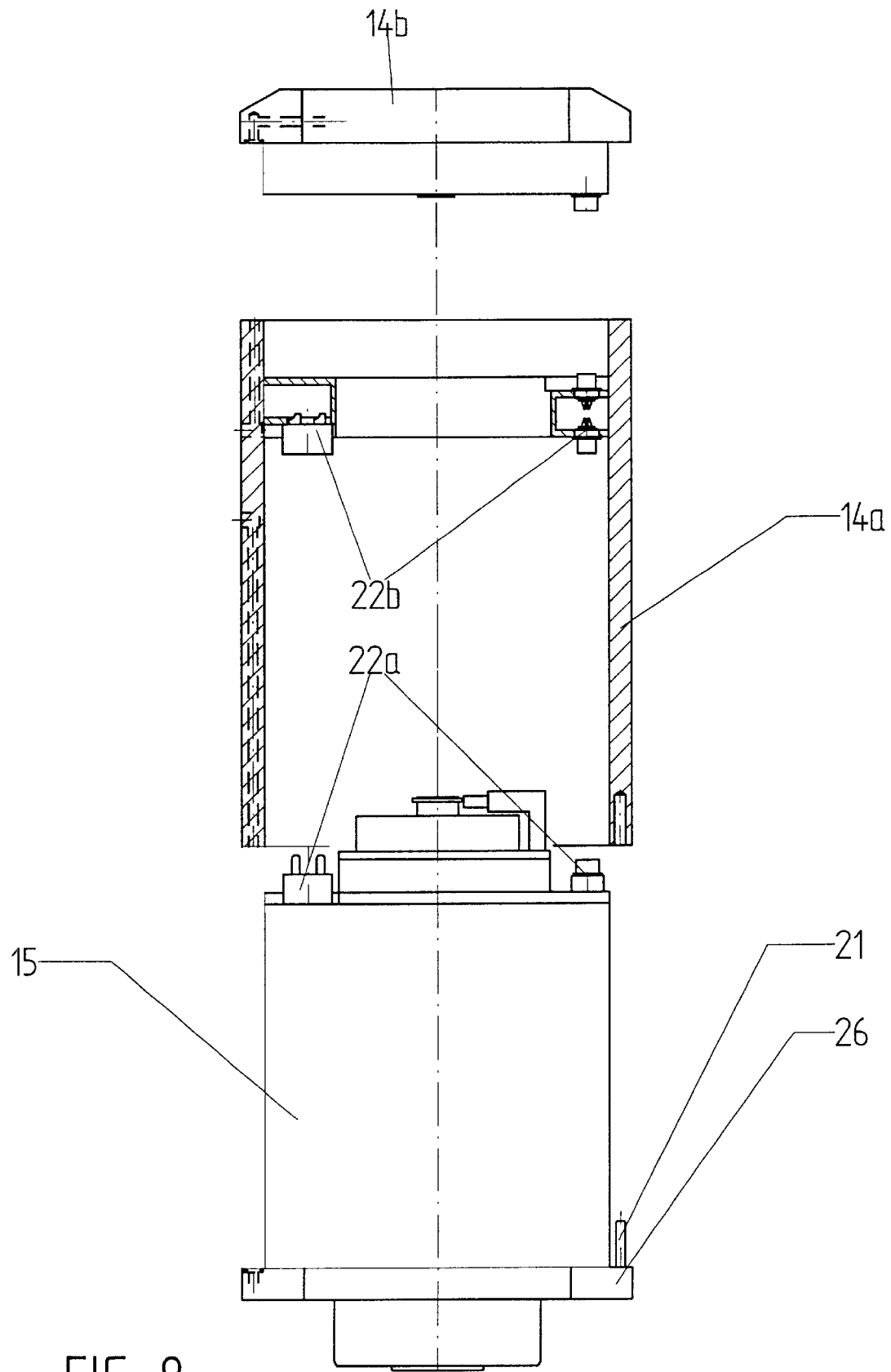
FIG. 8 represents a section of an electro-spindle partially extracted from its support cradle.

An alternative embodiment of the electro-spindle 15 and of the cradle 14, in accordance with the present invention, is shown in section, in FIG. 7 with the electro-spindle 15 blocked and in FIG. 8 with the electro-spindle 15 partially extracted from its support cradle 14.

The fastening between the rear part 14b and the front part 14a of the cradle 14 comes about by means of screws 50. The fastening between the electro-spindle 15 and the cradle 14 comes about by means of screws 51. At least one alignment pin 21 is always present on the flange 26 of the electro-spindle 15 and at least one respective seat on the cradle 14.

On the rear surface of the electro-spindle 15 the power and signal electric connectors 22a, are visible, with the respective electric connectors 22b on the internal surface of the cradle 14, and the connector 23a with respective 23b for the connection of the cradle with the pneumatic device 14b for coupling the tool.

In addition, the drillings 53 of hydropneumatic interconnection between the electro-spindle 15 and the external environment are also partially visible, for the services of automatic tool change, cone cleaning, pneumatic labyrinth, cooling etc.

Figure 9:
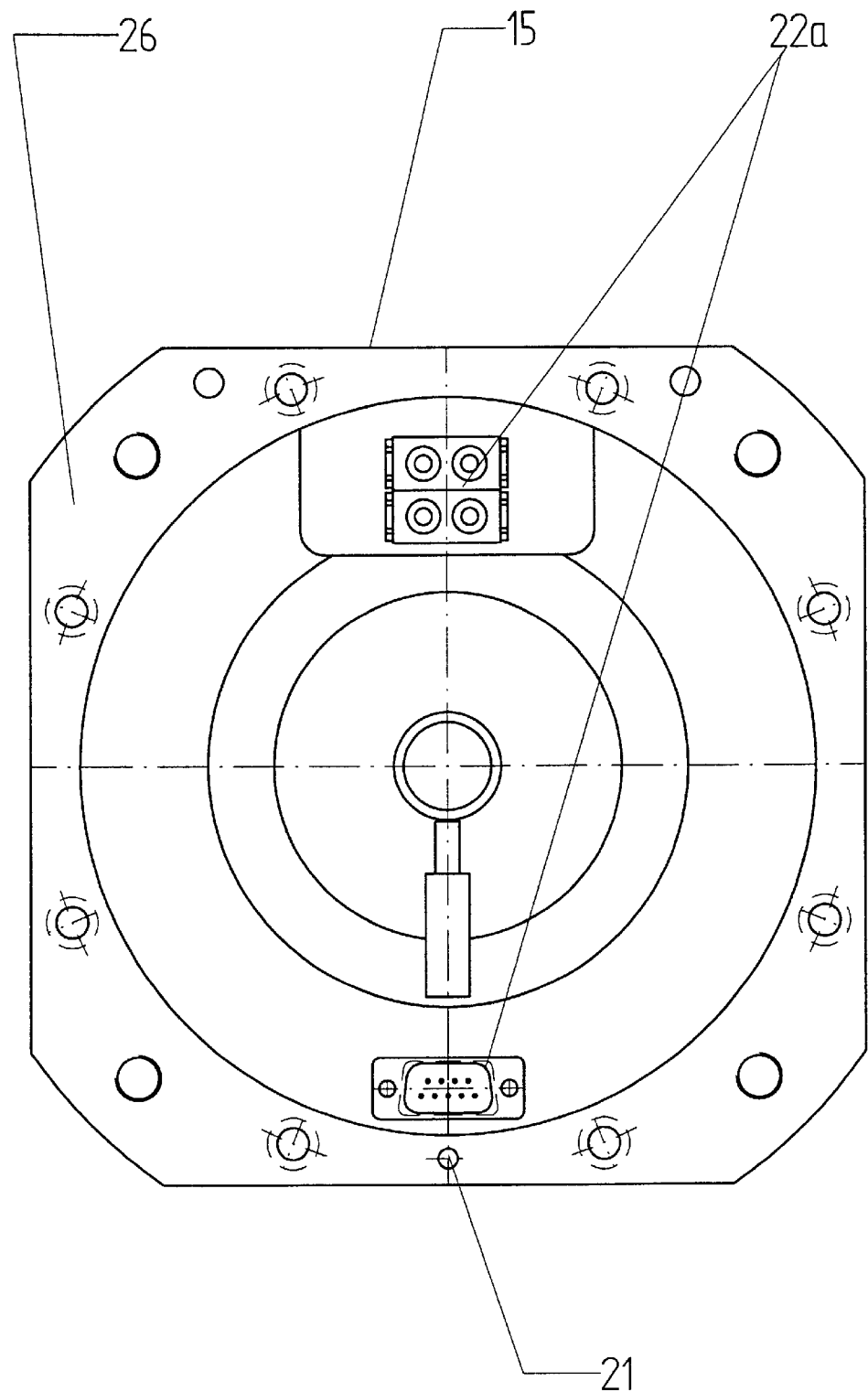
FIG. 9 shows the rear surface of the electro-spindle of FIG. 8 with the relative connectors.

FIG. 9 shows the rear surface of the electro-spindle 15 of FIG. 8 with the relative power and signal electric connectors 22a.

Figure 10:
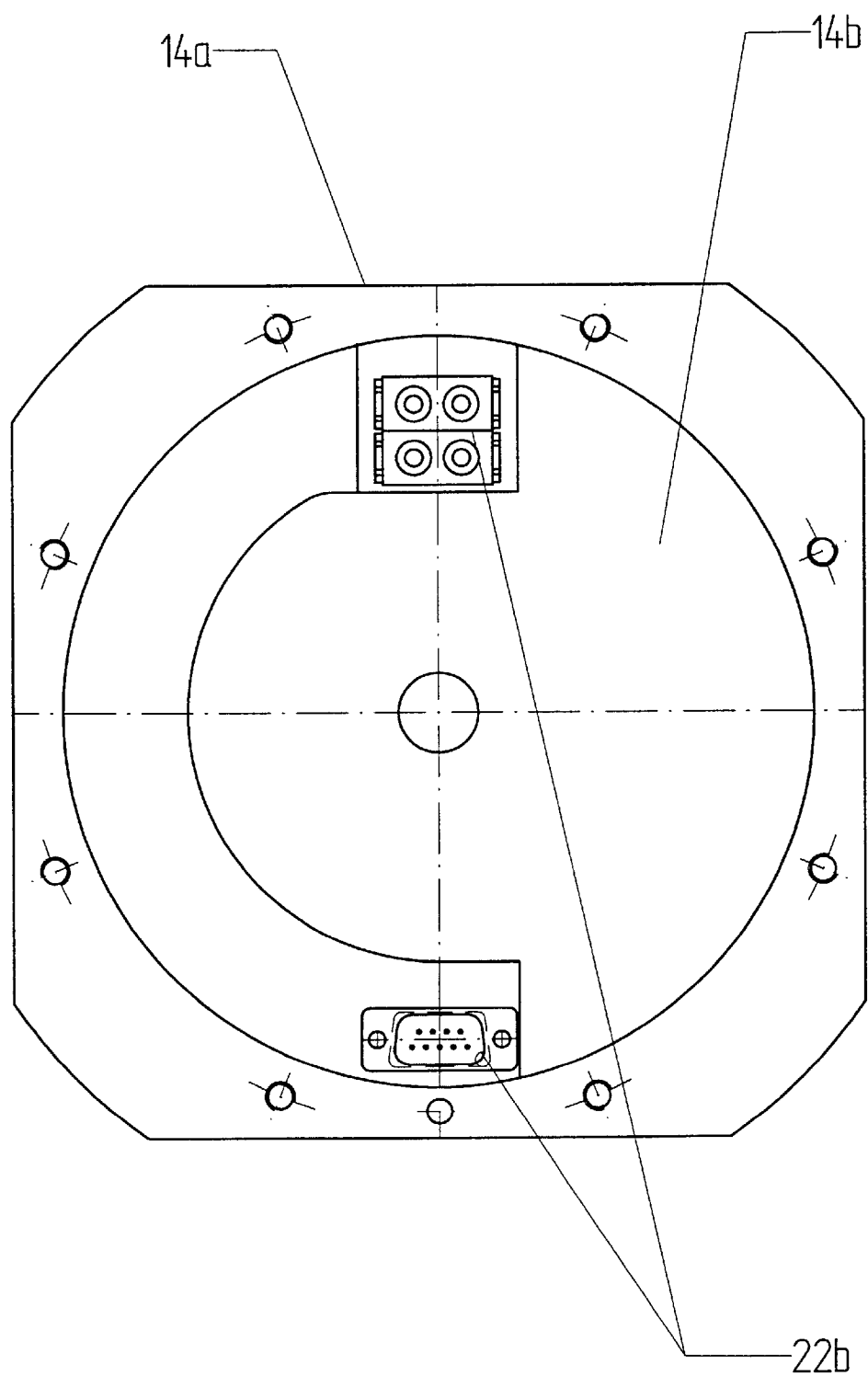
FIG. 10 shows the internal bottom surface of the cradle of FIG. 8 with the relative connectors.

FIG. 10 shows the internal bottom surface of the cradle 14 of FIG. 8 with the relative electric connectors 22b positioned so that they can connect to the electric connectors 22a.

In accordance with the present invention, and in particular to the embodiment shown in FIGS. 3 and 4, in the case of replacement of the electro-spindle 15, in automatic mode, the machine tool controlled by its control member moves the arm on which the tilting head is mounted towards the electro-spindle store zone, it positions itself correctly on a picking element suitable for holding and storing the electro-spindle, releases the hydraulic coupling/uncoupling hydraulic devices 20 between the electro-spindle 15 and the support 13, and through suitable movement (traction) between the picking element and the tilting head the electric and hydropneumatic connectors are released (automatically). The electro-spindle at this point is completely released and put away, the arm of the machine tool can thus move and automatically and autonomously couple another electro-spindle.

Should the hydraulic coupling/uncoupling hydraulic devices 20 not be present between the electro-spindle 15 and the support 13, but the electro-spindle is fixed by means of screws to the cradle 14, an operator can release it from its seat by unscrewing the screws, extract it automatically, for the electric connections, and automatically insert another one and fix it with the screws to the cradle 14.

It should be understood that a wide range of changes and modifications can be made to the preferred embodiments described herein without departing from the scope and spirit of the invention which are defined in the following appended claims.

What is claimed is:

1. A tilting head for machine tool comprising:
   a support element coupled to said tilting head;
   an electro-spindle;
   a cradle shaped suitably to incorporate and hold said electro-spindle pivoted on said support element so that it turns around an axis perpendicular to the axis of said tilting head;
   said electro-spindle being set up to have mechanical, electrical, pneumatic and hydraulic connections with said cradle; and
   wherein said connections of said electro-spindle are of the releasable type so that said electro-spindle is interchangeable and can be rapidly coupled to and uncoupled from said cradle.

2. The tilting head according to claim 1 wherein said mechanical connections comprise:
   a hydraulically controlled coupling and uncoupling device inserted in said cradle;
   a flange placed on one extreme of said electro-spindle suitable for placement against said cradle; and
   at least one tang placed on said flange suitable for coupling with said coupling and uncoupling device.

3. The tilting head according to claim 1 wherein said mechanical connections comprise screws for fastening a flange against said cradle, said flange being placed at one extreme of said electro-spindle and suitable for placement against said cradle.

4. The tilting head according to claim 1 wherein said mechanical connections comprise means of alignment of said electro-spindle relative to said cradle.

5. The tilting head according to claim 2 wherein said mechanical connections further comprise means of alignment of said electro-spindle relative to said cradle.

6. The tilting head according to claim 3, wherein said mechanical connections further comprise means of alignment of said electro-spindle relative to said cradle.

7. The tilting head according to claim 4 wherein said means of alignment comprise at least one alignment pin located on one flange placed at one extreme of said electro-spindle and suitable for going up against said cradle and one respective seat, placed on said cradle, suitable for co-operating with said pin.

8. The tilting head according to claim 5, wherein said means of alignment comprise at least one alignment pin located on one flange placed at one extreme of said electro-spindle and suitable for going up against said cradle and one respective seat, placed on said cradle, suitable for co-operating with said pin.

9. The tilting head according to claim 6, wherein said means of alignment comprise at least one alignment pin located on one flange placed at one extreme of said electro-spindle and suitable for going up against said cradle and one respective seat, placed on said cradle, suitable for co-operating with said pin.

10. The tilting head according to claim 4 wherein said means of alignment comprise a system formed by an invitation cone placed on said electro-spindle and by a respective counter cone located on said cradle.

11. The tilting head according to claim 5 wherein said means of alignment comprise a system formed by an invitation cone placed on said electro-spindle and by a respective counter cone located on said cradle.

12. The tilting head according to claim 6 wherein said means of alignment comprise a system formed by an invitation cone placed on said electro-spindle and by a respective counter cone located on said cradle.

13. The tilting head according to claim 1 wherein said electric connections are power connections and comprise a first quick coupling connector placed on the rear external surface of said electro-spindle and respective second quick coupling connector placed on the rear internal surface of said cradle suitable for co-operating with said first connector.

14. The tilting head according to claim 1 wherein said electric connections are signal connections and comprise a third quick coupling connector placed on the rear external surface of said electro-spindle and respective fourth quick coupling connector placed on the rear internal surface of said cradle suitable for co-operating with said third connector.

15. The tilting head according to claim 1 wherein said pneumatic and hydraulic connections comprise first quick coupling fittings placed on the rear external surface of said electro-spindle and respective second quick coupling fittings placed, on the rear internal surface of said cradle suitable for co-operating with said first fittings.

16. The tilting head according to claim 1 comprising a connecting thrust ring between said cradle and said support suitable for providing said cradle with an axis of rotation perpendicular to the axis of said head.

17. The tilting head according to claim 1 comprising a connecting thrust ring between said support and said machine tool suitable for providing said support with an axis of rotation coinciding with the axis of said head.

18. An electro-spindle and spindle supporting cradle assembly for a machine tool assembly comprising:
    an electro-spindle and a spindle supporting cradle pivotally connectable with the machine tool;
    the electro-spindle being set up to have mechanical, electrical, pneumatic and hydraulic connections with said cradle;
    wherein said connections of said electro-spindle are of the releasable type so that said electro-spindle is interchangeable and can be rapidly coupled to and uncoupled from said cradle;
    wherein said pneumatic and hydraulic connections comprise first quick coupling fittings placed on the rear external surface of said electro-spindle and respective second quick coupling fittings placed on the rear internal surface of said cradle suitable for co-operating with said first fittings.

19. A machine tool incorporating a tilting head comprising:
    a support element coupled to said tilting head;
    an electro-spindle;
    a cradle shaped suitably to incorporate and hold said electro-spindle pivoted on said support element so that it turns around an axis perpendicular to the axis of said tilting head;
    said electro-spindle being set up to have mechanical, electrical, pneumatic and hydraulic connections with said cradle; and wherein said connections of said electro-spindle are of the releasable type so that said electro-spindle is interchangeable and can be rapidly coupled to and uncoupled from said cradle.

20. The machine tool according to claim 19 further comprising:
a hydraulically controlled coupling and uncoupling device inserted in said cradle;
a flange placed on one extreme of said electro-spindle suitable for going up against said cradle; and
at least one tang placed on said flange suitable for coupling with said coupling and uncoupling device.

21. The machine tool according to claim 19 further comprising screws for fastening a flange against said cradle, said flange being placed at one extreme of said electro-spindle and suitable for going up against said cradle.

22. An electro-spindle and spindle supporting cradle assembly for a machine tool assembly comprising:
an electro-spindle and a spindle supporting cradle pivotally connectable with the machine tool;
the electro-spindle being set up to have mechanical, electrical, pneumatic and hydraulic connections with said cradle;
wherein said connections of said electro-spindle are of the releasable type so that said electro-spindle is interchangeable and can be rapidly coupled to and uncoupled from said cradle;
wherein said electric connections are power connections and comprise a first quick coupling connector placed on the rear external surface of said electro-spindle and respective second quick coupling connector placed on the rear internal surface of said cradle suitable for co-operating with said first connector.

23. An electro-spindle and spindle supporting cradle assembly for a machine tool assembly comprising:
an electro-spindle and a spindle supporting cradle pivotally connectable with the machine tool;
the electro-spindle being set up to have mechanical, electrical, pneumatic and hydraulic connections with said cradle;
wherein said connections of said electro-spindle are of the releasable type so that said electro-spindle is interchangeable and can be rapidly coupled to and uncoupled from said cradle;
wherein said electric connections are signal connections and comprise a third quick coupling connector placed on the rear external surface of said electro-spindle and respective fourth quick coupling connector placed on the rear internal surface of said cradle suitable for co-operating with said third connector.

24. An electro-spindle and spindle supporting cradle assembly for a machine tool assembly comprising:
an electro-spindle and a spindle supporting cradle pivotally connectable with the machine tool;
the electro-spindle being set up to have mechanical, electrical, pneumatic and hydraulic connections with said cradle;
wherein said connections of said electro-spindle are of the releasable type so that said electro-spindle is interchangeable and can be rapidly coupled to and uncoupled from said cradle;
wherein said mechanical connections comprise screws for fastening a flange against said cradle, said flange being placed at one extreme of said electro-spindle and suitable, for placement against said cradle.

25. The assembly according to claim 24, wherein said mechanical connections further comprise means of alignment of said electro-spindle relative to said cradle.

26. The assembly according to claim 25, wherein said means of alignment comprise at least one alignment pin located on one flange placed at one extreme of said electro-spindle and suitable for going up against said cradle and one respective seat, placed on said cradle, suitable for co-operating with said pin.

27. The assembly according to claim 25 wherein said means of alignment comprise a system formed by an invitation cone placed on said electro-spindle and by a respective counter cone located on said cradle.

* * * * *